United States Patent [19]

Webster

[11] Patent Number: 4,882,869
[45] Date of Patent: Nov. 28, 1989

[54] COMBINATION RIFLE REST AND ANIMAL CHOKE STICK

[76] Inventor: John R. Webster, 12219 Navajo St., Savannah, Ga. 31419

[21] Appl. No.: 231,029

[22] Filed: Aug. 11, 1988

[51] Int. Cl.$^4$ ............................................. F41C 29/00
[52] U.S. Cl. ....................................................... 42/94
[58] Field of Search ................ 42/94; 43/87; 119/153

[56] References Cited

U.S. PATENT DOCUMENTS

| | | | |
|---|---|---|---|
| 613,241 | 11/1898 | Burton | 42/94 |
| 1,890,423 | 12/1932 | Teagarden | 42/94 |
| 2,704,052 | 3/1955 | Wood | 43/87 |
| 3,608,852 | 9/1971 | Horn | 42/94 |
| 3,863,376 | 2/1975 | Dalmaso | 42/94 |
| 3,949,514 | 4/1976 | Ramsey | 43/87 |
| 4,017,997 | 4/1977 | Peterson et al. | 42/94 |
| 4,026,057 | 5/1977 | Cady | 42/94 |
| 4,575,964 | 3/1986 | Griffin | 42/94 |
| 4,676,021 | 6/1987 | Groba | 42/94 |

FOREIGN PATENT DOCUMENTS 908108  4/1954  Fed. Rep. of Germany .......... 42/94

Primary Examiner—Charles T. Jordan
Attorney, Agent, or Firm—Cushman, Darby & Cushman

[57] ABSTRACT

A device to rest and balance firearms at continuously adjustable height to enable firing from the prone, kneeling, sitting and standing positions. The device includes two hollow cylindrical telescoping rigid tubes, the inner of which includes a top member defining an upper firearm supporting yoke and the outer of which has attached to it a continuously adjustable spring-locking device defining a lower firearm rest. A strong, flexible cable is provided within the tube which, with the upper firearm support used as a handle, converts the device to an animal choke stick. A detachable ground spike is mounted to the base of the outer tube and doubles as a knife. A separate attachment for insertion into the top of the inner cylindrical tube is further provided for resting and balancing cameras.

6 Claims, 3 Drawing Sheets

COMBINATION RIFLE REST AND ANIMAL CHOKE STICK

BACKGROUND OF THE INVENTION

1. Field of the Invention

The invention relates to a device which functions as a combination adjustable rifle rest or camera rest, and animal choke stick. The device is stabilized by a ground stake which protrudes into the earth and allows the resting of a rifle at continuous heights in two stages from 5" to 36" and 40" to 71", thereby allowing firing in prone, sitting, kneeling and standing positions. With the ground stake removed, the device has a telescoping inner tube at the bottom end of which is a choke cable for ensnaring and immobilizing animals. The device allows for the insertion of a swivel ball type camera mount to also function as a camera rest.

2. Description of the Prior Art

A choke stick comprising an adjustable snare which includes a piece attachable thereto which may enable the device to be utilized as a rifle rest is described in U.S. Pat. No. 3,949,514 to Ramsey. Various forms of lightweight, portable, foldable rifle supports have been heretofore provided, examples of which are U.S. Pat. Nos. 3,863,376 to Dalmaso, 4,017,997 to Peterson and Snyder, 3,608,852 to Horn, and 4,026,057 to Cady. However, none of these supports provide a multifunctioned device which advantageously can be used as a fully adjustable rifle rest or camera rest and as a choke stick.

SUMMARY OF THE INVENTION

It is an object of the present invention to provide a multifunction structure which can be used as a choke stick, as a rifle rest, and or as a camera rest. These and other objects are realized in accordance with the present invention by providing two telescoping cylindrical tubes held together structurally by a spring-locking device which is permanently attached to the upper portion of the outer tube member, and through which the inner tube member slides. The inner tube member has an upper rifle supporting yoke at the top end thereof which doubles as the choke stick handle. A knife-like ground spike attaches to the lower end of the outer tube member in a bayonet-like fashion allowing insertion into the ground for stability.

Attached to the outer tube member is a second, or lower spring-locking device which has a flange member extending outwardly and perpendicularly to said outer tube member defining a lower, half-yoke rifle rest. By squeezing the locking handle of the lower spring-locking device, the lower half-yoke rifle rest slides up and down the outside of the outer tube member allowing the lower rifle rest to be adjusted continuously in heights varying from 5" to 36" above the ground. By squeezing the locking handle of the upper spring-locking device, the inner tube member can be raised or lowered so that the upper rifle supporting yoke can be adjusted continuously at heights ranging from 40" to 71" above the ground. Thus, the device functions as a portable, adjustable rifle rest which can be used in the prone, sitting, kneeling and standing firing positions.

Within the inner tube member is a steel cable encased in a plastic housing which functions as the choke stick cable. Attached to the upper end of said steel cable is a crimped sleeve which slides freely within the inner tube member, but which is slightly larger than the hole at the lower end of said inner tube member. The opposite, or lower, end of the choke cable extends out from the lower end of the inner tube member and is laced through two small holes of a flange attached to the outside lower end of the outer tube member. With the ground spike removed from the outer tube member, by lifting the locking handle of the upper spring-locking device, the inner tube member is released and can be slid all the way down within the outer tube member, which allows the choke stick cable to extend outwardly in an ever expanding loop. The loop is then placed around the neck of an animal desired to be ensnared or immobilized. Using now the upper rifle supporting yoke as a choke stick handle, one merely pulls on said handle member upwardly which telescopes the inner tube member out from inside the outer tube member, freely through the upper spring-locking device, thereby closing the choke cable loop tightly around the animal's neck, immobilizing the animal and allowing for its safe removal from, for example, a trap. Finally, a carrying cable attaches to the upper fixed bar of the lower locking device and also attaches to the ground spike which, when said ground spike is fastened to the lower end of the outer tube member, allows the device to be carried easily from, for example, the shoulder.

Other objects, features and characteristics of the present invention, as well as the methods of operation and functions of the related elements of the structure, and the combination of parts and economies of manufacture will become more apparent upon consideration of the following detailed description and the appended claims with reference to the accompanying drawings all of which form a part of this specification, wherein like reference numerals designate corresponding parts in the various figures.

DESCRIPTION OF THE PREFERRED EXEMPLARY EMBODIMENT

Figure 1:
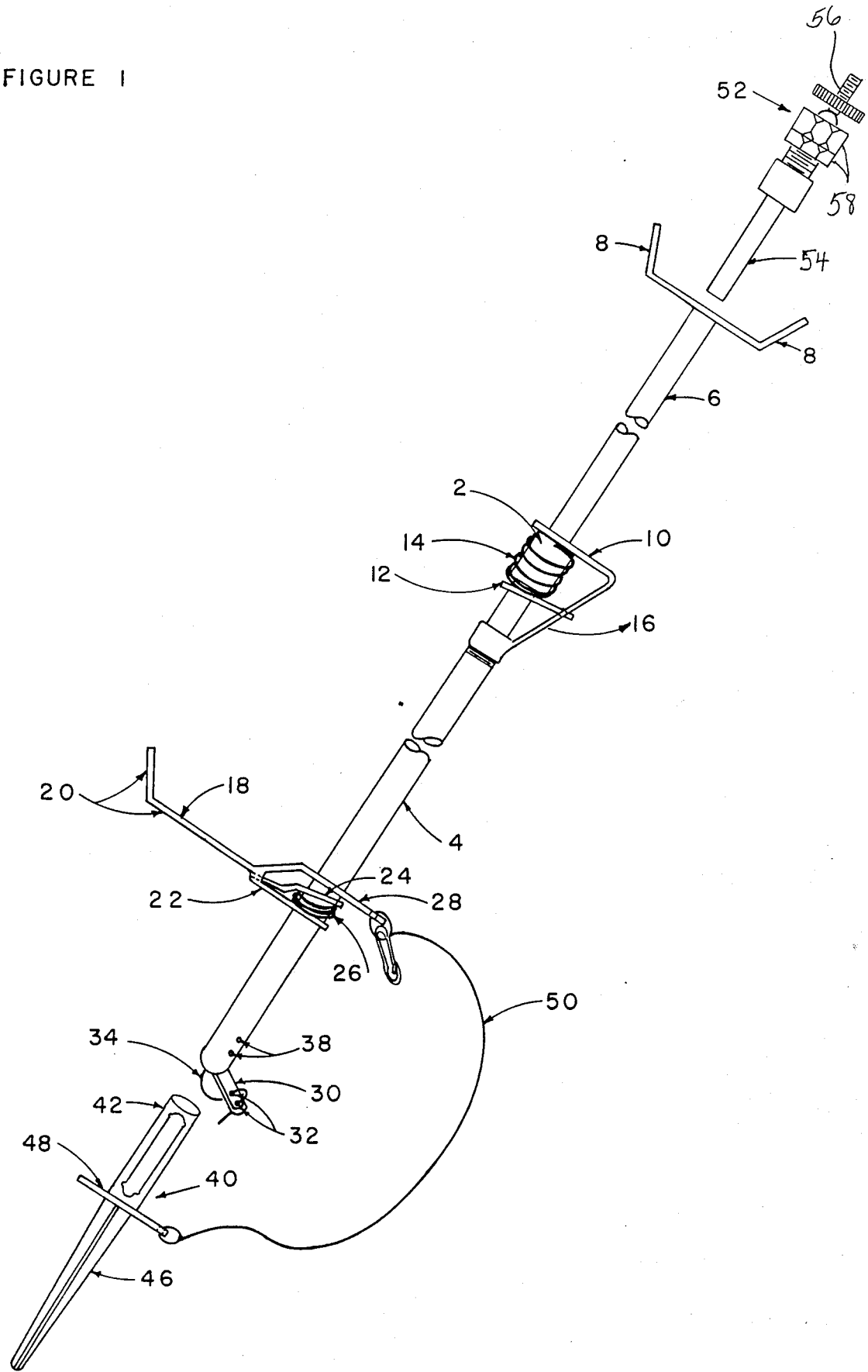
FIG. 1 is a perspective view of the device with the ground spike attached and the upper rifle rest moderately extended.

FIG. 1 shows the device ready for use as a dual adjustable rifle rest with ground stake attached. The device generally includes two hollow cylindrical telescoping tubes 4 and 6. The inner tube member 6 has permanently attached to it at the top an upper firearm supporting yoke 8. The outer tube member 4 has permanently attached to it at the top an upper spring-locking device 16 which locks the inner tube member 6 in place at its desired height. The outer tube member 4 has attached to it in a sleeve-like fashion a lower locking device 20 which in turn has a flange 18 which serves as a lower half-yoke rifle rest. The lower locking device 20 slides up and down the outer tube member 4 and locks in place at the desired height, as described more fully below. A ground spike 40 attaches to the lower end of the outer tube member 4 by slipping like a sleeve over the lower end of said outer tube member 4. A carrying cable made of nylon, or other flexible material, is attached to the upper arm 28 of the lower locking device 20, and is also attached to the ground spike 40 at one of its flange guards 48.

As can be further seen in FIG. 1, a swivel ball type camera mount can be mounted to the top end of the inner tube member 6 as shown generally at 52 so that the device defines a camera rest. In the illustrated embodiment, a hollow or solid cylindrical element 54 is attached to a conventional swivel ball type camera mount 56 by, for example, nuts 58. The cylindrical element 54 is sized so as to be slidably receivable in the top end of the inner tube member 6. Thus, when it is desired to provide a camera rest, the cylindrical element 54 with the camera mount 56 coupled thereto is simply inserted into the hollow uppermost end of tube member 6 in the middle of yoke 8.

Figure 2:
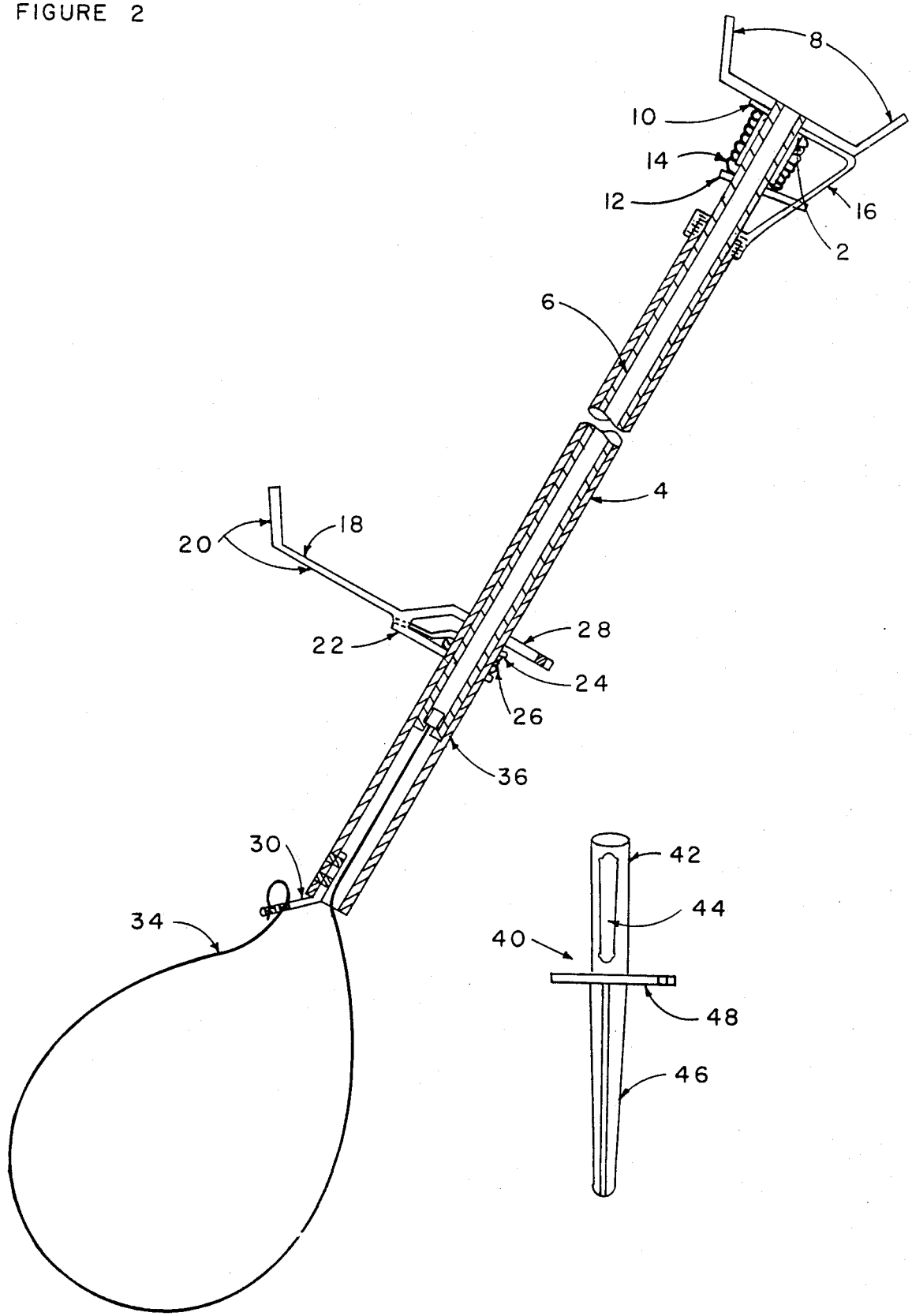
FIG. 2 is a perspective view of the device showing the ground stake removed, and the upper rifle rest choke stick handle fully lowered, with the choke stick cable extended.

FIG. 2 shows the device with the ground spike 40 removed and the choke stick cable 34 extended outwardly from the bottom of the outer tube member 4 forming an ensnaring loop. The device is shown in this Figure with the inner tube member 6 almost fully enclosed within the outer tube member 4.

Figure 3:
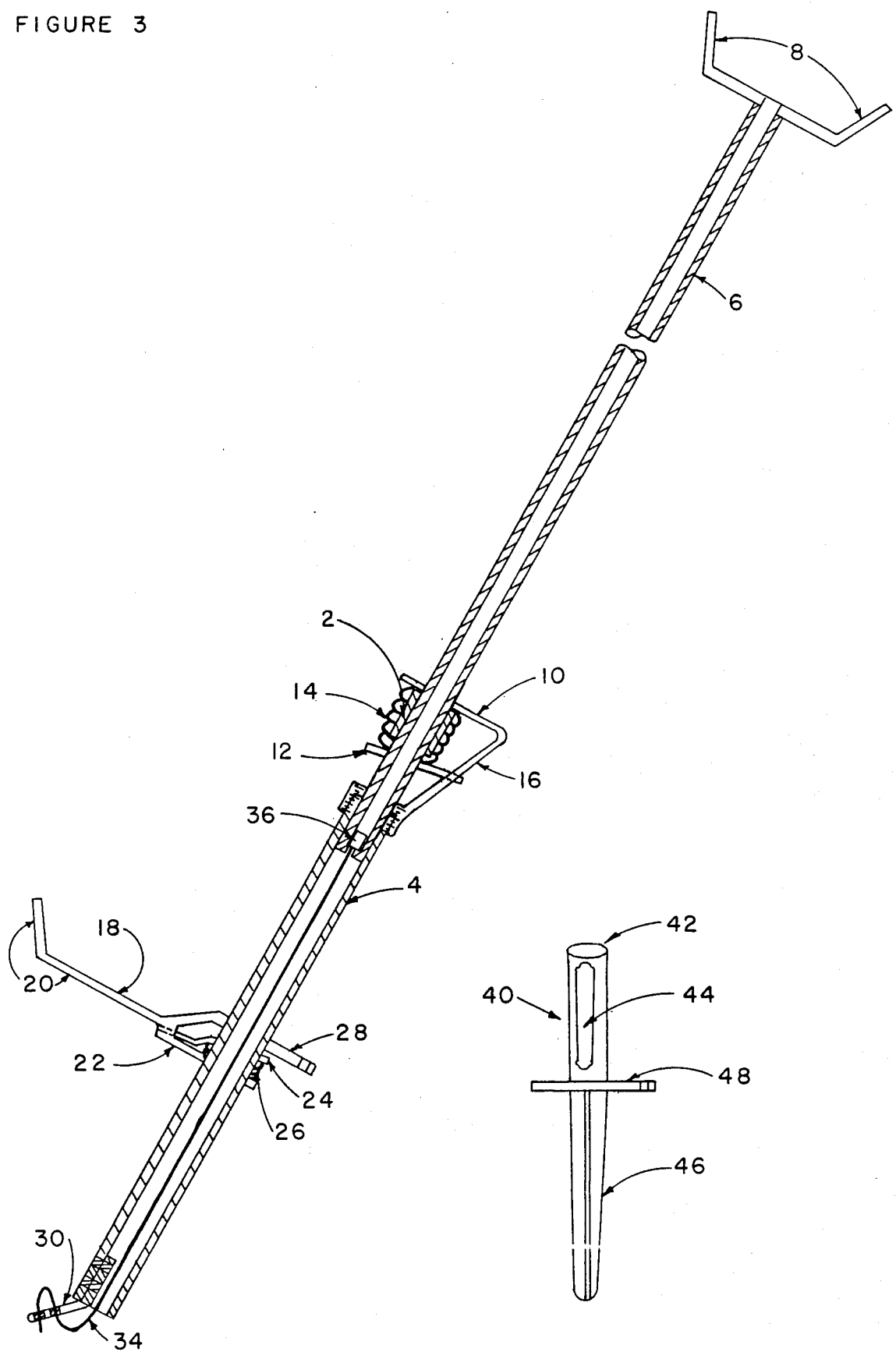
FIG. 3 is a side cross sectional view of the device.

Turning now to FIG. 3, the device is shown with the inner tube member 6 almost fully extended. As can be seen, upper spring-locking device 16 is permanently attached to the upper end of the outer tube member 4 and consists of a rigid upper arm member 10, a movable locking handle 12, and a spring 14. The spring 14 keeps tension against the locking handle 12, locking the inner tube member 6 in place. By pulling upward on the locking handle 12, the lock is released and the inner tube member then slides freely through the arm 10 and may be inserted into the outer tube member 4. The inner tube member 6 may be telescoped upward from within the outer tube member 4 without releasing the locking handle 12.

The lower locking device 20 consists of a rigid upper arm 28, a rigid lower arm 22, a movable locking handle 24, a spring 26 and a rigid half-yoke rifle rest 18. The lower rifle rest 18 may be adjusted downwardly along the shaft of the outer tube member 4 by pulling downward on the locking handle 24, thereby releasing the lock, so that the rifle rest 18 and locking device 20 may be slid downwardly to the desired height. Releasing the locking handle 24 locks the lower rifle rest 18 into place at the desired height. The locking device 20 and lower rifle rest 18 may be pulled freely up the shaft of the outer tube member 4 until reaching the desired height, locking automatically into place upon release.

Within the core of the inner tube member 6 is a choke stick cable 34. There is a sleeve 36 which is crimped, welded or otherwise attached to the upper end of the choke stick cable 34. The sleeve 36 is slightly larger than the diameter of the hole at the bottom of the inner tube member 6 so that when the choke stick cable 34 is extended outwardly in a loop from the bottom of the inner tube member 6, it cannot be pulled all the way out. At the bottom of the outer tube member 4, there is a flange 30 attached to said outer tube member 4 by two rivets 38, or otherwise attached, and having two small holes 32. The bottom end of the choke stick cable 34 extends through a small hole in the bottom of the inner tube member 6 and is laced through one hole 32 and out the other hole 32, fixing the end of said choke cable 34 to the flange 30. The choke stick cable 34 may then be pulled downwardly until the sleeve is stopped by the smaller diameter hole at the bottom of the inner tube member 6, forming a loop as shown in FIG. 2. The upper rifle rest 8 can then be used as a choke stick handle and pulled freely through the upper spring-locking device 16 and, when done so, the sleeve 36, caught by the smaller diameter hole at the bottom of the inner tube member 6 is pulled upwardly thereby closing the loop of the choke stick cable 34 tightly around the neck of the animal sought to be ensnared thereby.

The ground spike shown generally at 40 consists of a triple blade 46, a double flanged guard 48, and a hollow cylindrical handle 42 with an oblong opening 44. The handle 42 and the oblong opening 44 are designed so that the handle, slides easily over the flange 30 and fits like a sleeve over part of the outer tube member 4. The double flanged guard 48 prevents the ground spike from being buried past the bottom of the outer tube member 4. The triple blade 46 adds stability to the device by preventing sway and rotation. Finally, the carrying cable 50 can be made of plastic, nylon or any other suitable flexible material, and is attached at the top rigid flange 28 of the lower locking device 20 and is also attached to one of the double flanged guards 48 of the ground spike 40.

While the invention has been described in connection with what is presently considered to be the most practical and preferred embodiment it is to be understood that the invention is not limited to the disclosed embodiment, but, on the contrary, it is intended to cover various modifications and equivalent arrangements included within the spirit and scope of the appended claims.

What I claimed is:

1. A portable device for permitting the resting of a rifle or other firearm at any position including prone, kneeling, sitting and standing, comprising:
    inner and outer hollow cylindrical rigid tube members, each said tube member having a proximal end and a distal end, said inner tube member being telescopically received through the proximal end of said outer tube member, said tube members thereby providing support for a rifle or other firearm in a stable, balanced attitude;
    an upper firearm supporting yoke provided at the proximal end of the inner tube member;
    a lower firearm support coupled to the outer tube member:
    means for mounting a ground spike for insertion into the ground to the distal end of said outer tube member; and
    means for adjusting a length of the inner tube member extending proximally from the outer tube member and for locking said inner tube member relative to said outer tube member so that the upper firearm support means can be continuously adjusted in height and locked into place, wherein said outer tube member further includes means for continuously adjusting the position of the lower firearm support along the outer tube member and for locking the lower firearm support in place.

2. A device according to claim 1, in combination with a ground spike for insertion into the ground to stabilize and balance said tube members.

3. A device according to claim 2, further comprising a flexible but strong cable disposed within said inner tube member and extendable as a loop from the distal end of said outer tube member so as to define an adjustable choke stick.

4. A device according to claim 3, further comprising a flexible cable attached to said lower firearm support and to said ground spike for easy carrying of the tube members.

5. A device according to claim 4, in combination with a swival ball type camera mount slidably coupled to the proximal end of said inner tube member for universally mounting in a balance attitude a camera.

6. A device according to claim 2, wherein said means for mounting includes means for removably coupling said ground spike whereby said spike can be detached and used as a knife.

* * * * *